(12) United States Patent  
Kim et al.

(10) Patent No.: US 8,237,552 B2  
(45) Date of Patent: Aug. 7, 2012

(54) METHOD AND APPARATUS FOR CONTROLLING INPUT/OUTPUT INTERFACE

(75) Inventors: Yoon Sang Kim, Yongin-si (KR); Byung Seok Soh, Suwon-si (KR); Joonkee Cho, Suwon-si (KR); Joonah Park, Seoul (KR); Kee-Eung Kim, Seoul (KR); Junghyun Shim, Seongnam-si (KR); Hyunjeong Lee, Yong-si (KR); Sung Jung Cho, Suwon-si (KR); Gyunghye Yang, Seoul (KR); Wook Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 504 days.

(21) Appl. No.: 11/291,927

(22) Filed: Dec. 2, 2005

(65) Prior Publication Data

US 2006/0197860 A1 Sep. 7, 2006

(30) Foreign Application Priority Data

Mar. 4, 2005 (KR) .......................... 10-2005-0018136

(51) Int. Cl.  
*H04B 3/36* (2006.01)

(52) U.S. Cl. ..................................... 340/407.1; 345/418

(58) Field of Classification Search ............... 340/407.1; 345/418; 715/530  
See application file for complete search history.

(56) References Cited

U.S. PATENT DOCUMENTS

| 7,068,256 B1 * | 6/2006 | Gettemy et al. .............. 345/156 |
| 2002/0149561 A1 | 10/2002 | Fukumoto et al. |
| 2002/0154095 A1 * | 10/2002 | Whitcomb ................. 345/163 |
| 2006/0170669 A1 * | 8/2006 | Walker et al. ................. 345/418 |
| 2008/0018614 A1 | 1/2008 | Rekimoto |

FOREIGN PATENT DOCUMENTS

| KR | 1020020037771 | 5/2002 |
| KR | 10-2004-0032243 | 4/2004 |
| KR | 1020040051202 | 6/2004 |
| KR | 10-2004-0106552 | 12/2004 |

OTHER PUBLICATIONS

Korean Non Final Rejection issued Sep. 7, 2011, corresponds to Korean Patent Application No. 10-2005-0018136.  
Korean Notice of Allowance dated Mar. 22, 2012 in corresponding Korean Application No. 10-2005-0018136.

* cited by examiner

*Primary Examiner* — Shirley Lu  
(74) *Attorney, Agent, or Firm* — Staas & Halsey LLP

(57) ABSTRACT

A method of controlling an input/output interface of a mobile terminal which receives a user command, and an apparatus to perform the method, the method including receiving the user command that selects a functional mode of the mobile terminal; perceiving the functional mode of the mobile terminal using the received user command; and controlling the input/output interface, which provides a sense of physical contact corresponding to the perceived functional mode, to be activated.

34 Claims, 11 Drawing Sheets

METHOD AND APPARATUS FOR CONTROLLING INPUT/OUTPUT INTERFACE

CROSS-REFERENCE TO RELATED APPLICATIONS

This application claims the benefit of Korean Patent Application No. 10-2005-0018136, filed on Mar. 4, 2005, in the Korean Intellectual Property Office, the disclosure of which is incorporated herein by reference.

BACKGROUND OF THE INVENTION

1. Field of the Invention

The present invention relates to an apparatus to control, and a method of controlling, an input/output (I/O) interface according to a functional mode of a mobile terminal, and, more particularly, to an I/O interface apparatus to provide an I/O interface by perceiving a functional mode of a mobile terminal that a user desires to select according to a surface region of the mobile terminal that the user touches, the user's voice, and the movement of the mobile terminal, and providing the user with a sense of physical contact corresponding to the perceived functional mode.

2. Description of the Related Art

Recently, the use of mobile terminals such as cellular phones and personal digital assistants (PDAs) has become more widespread. The mobile terminal has been manufactured to include fundamental functions such as making a telephone call and storing and processing information, and further to include various functions such as, for example, taking a digital photograph, receiving and/or transmitting a short message service (SMS) message, taking a moving picture, and storing an electronic dictionary.

FIG. 1 illustrates examples of interfaces provided in a conventional mobile terminal such as a cellular phone. Referring to FIG. 1, the mobile terminal includes a camera module 10, and a plurality of button-type I/O interfaces 20, 30, 50, 52, and 60 to capture an image using the camera module 10. To capture the image using the camera module 10, a user changes a current mode to a camera mode using the button-type I/O interface 20. Then, a plurality of functions belonging to the camera mode are displayed on a display unit 40 of the cellular phone. Next, the user selects one of the plurality of functions using the button-type interfaces 50 and 52. When the user selects a user command for capturing the image using the button-type interfaces 50 and 52, the image to be captured via a camera lens (not shown) is displayed on the display unit 40. Next, the user captures the image by inputting the user command to the cellular phone using the button-type interface 60.

As described above, a conventional mobile terminal includes a plurality of I/O interfaces through which a user command is input to select a predetermined mode from among a plurality of functional modes, and a plurality of I/O interfaces through which a user command is input to select functions of the selected functional mode to be controlled.

Conventionally, the I/O interfaces are metallic mould buttons provided on the mobile terminal. The button-type I/O interfaces are formed to predetermined thicknesses and sizes, and thus occupy a relatively large space in the mobile terminal. Accordingly, it is very difficult to manufacture a small, light, and thin mobile terminal, which is preferred by the contemporary user. Also, I/O interfaces required for a predetermined functional mode are provided on the mobile terminal, thereby increasing the size of the mobile terminal.

SUMMARY OF THE INVENTION

The present invention provides an input/output (I/O) interface apparatus to perceive a functional mode of a mobile terminal using a user command that selects a predetermined functional mode, and to activate an I/O interface that provides a user with a sense of physical contact corresponding to the perceived functional mode.

The present invention also provides an input/output (I/O) interface method of perceiving a functional mode of a mobile terminal using a user command that selects a predetermined functional mode, and activating an I/O interface that provides a user with a sense of physical contact corresponding to the perceived functional mode.

Additional aspects and/or advantages of the invention will be set forth in part in the description which follows and, in part, will be apparent from the description, or may be learned by practice of the invention.

According to one aspect of the present invention, there is provided an apparatus to control an input/output interface of a mobile terminal which receives a user command, the apparatus including an input unit to receive a user command which selects a functional mode of the mobile terminal; a perceiving unit to perceive the functional mode of the mobile terminal corresponding to the received user command; and an activating unit to activate the input/output interface to provide a sense of physical contact corresponding to the perceived functional mode.

The apparatus may further include a first controller to control the input/output interface corresponding to the perceived functional mode to be activated, and may further include a second controller to control a graphic user interface corresponding to the perceived functional mode.

The apparatus may further include a first storage unit to store one of a graphic user interface model and an input/output model which correspond to the perceived functional mode. The second controller may control the graphic user interface to be activated based on the graphic user interface model stored in the first storage unit, and the first controller may control the input/output interface to be activated based on the input/output interface model stored in the first storage unit.

According to another aspect of the present invention, there is provided a method of controlling an input/output interface of a mobile terminal which receives a user command, the method including receiving the user command which selects a functional mode of the mobile terminal, perceiving the functional mode of the mobile terminal using the received user command, and controlling an input/output interface, which provides a sense of physical contact corresponding to the perceived functional mode, to be activated.

The method may further include controlling a graphic user interface corresponding to the perceived functional mode to be displayed.

According to another aspect of the present invention, there is provided an apparatus to control an input/output interface of a mobile terminal which receives a user command, the apparatus comprising an input unit to receive the user command which selects a functional mode of the mobile terminal; and a controller to provide a physical sensation corresponding to the selected functional mode.

According to another aspect of the present invention, there is provided an apparatus to control an input/output interface of a mobile terminal which receives a user command, the apparatus comprising an input unit to receive the user command which selects a functional mode of the mobile terminal; wherein the selected functional mode is determined according to a physical orientation of the mobile terminal relative to a gravitational pull, and/or according to a movement of the mobile terminal relative to the gravitational pull.

According to another aspect of the present invention, there is provided a method of controlling an input/output interface of a mobile terminal which receives a user command, the method comprising receiving the user command which selects a functional mode of the mobile terminal; and providing a physical sensation corresponding to the selected functional mode.

According to another aspect of the present invention, there is provided a method of controlling an input/output interface of a mobile terminal which receives a user command, the method comprising receiving the user command which selects a functional mode of the mobile terminal; wherein the selected functional mode is determined according to a physical orientation of the mobile terminal relative to a gravitational pull, and/or according to a movement of the mobile terminal relative to the gravitational pull.

According to another aspect of the present invention, there is provided an apparatus to control an input/output interface of a mobile terminal which receives a user command, the apparatus comprising an input unit to receive the user command which selects a functional mode of the mobile terminal; wherein a generated physical sensation is provided to the input unit according to the selected functional mode, the generated physical sensation being different than a physical sensation sensed from a body of the mobile terminal.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
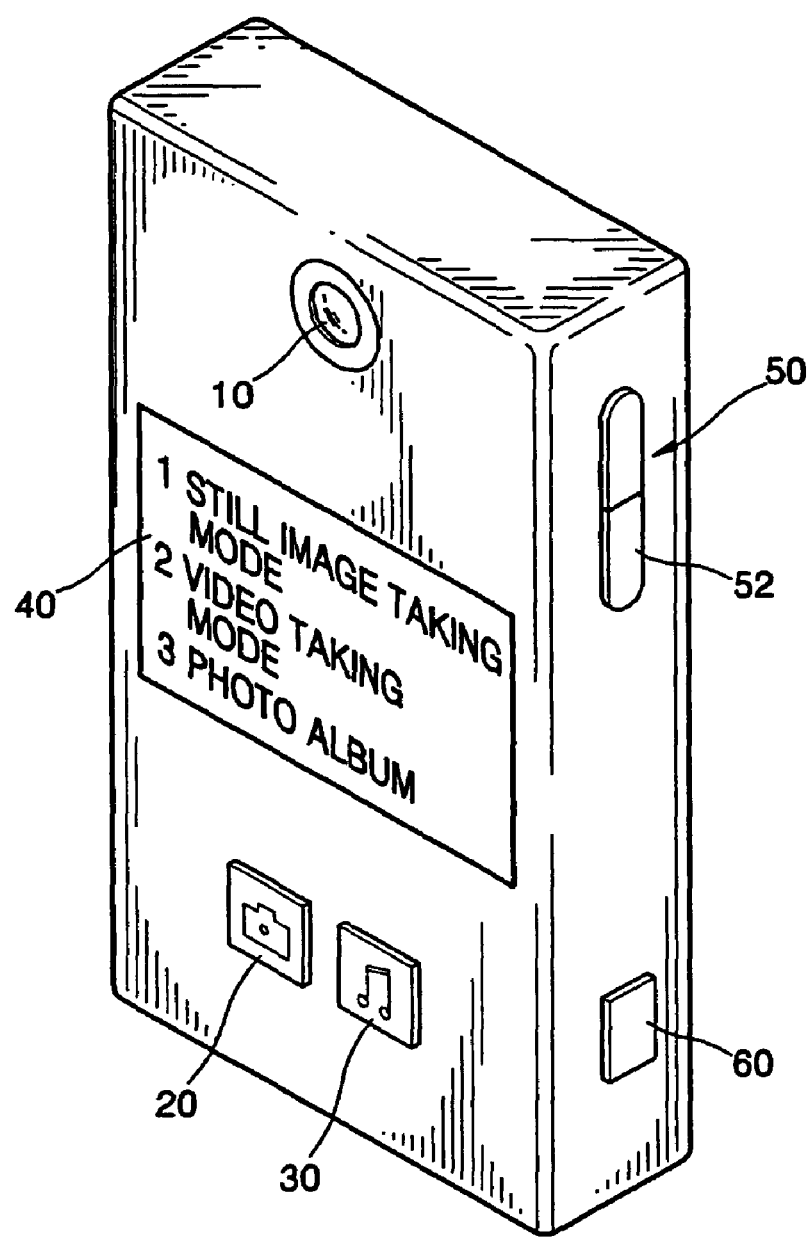
FIG. 1 illustrates examples of an input/output (I/O) interface installed in a conventional mobile terminal.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
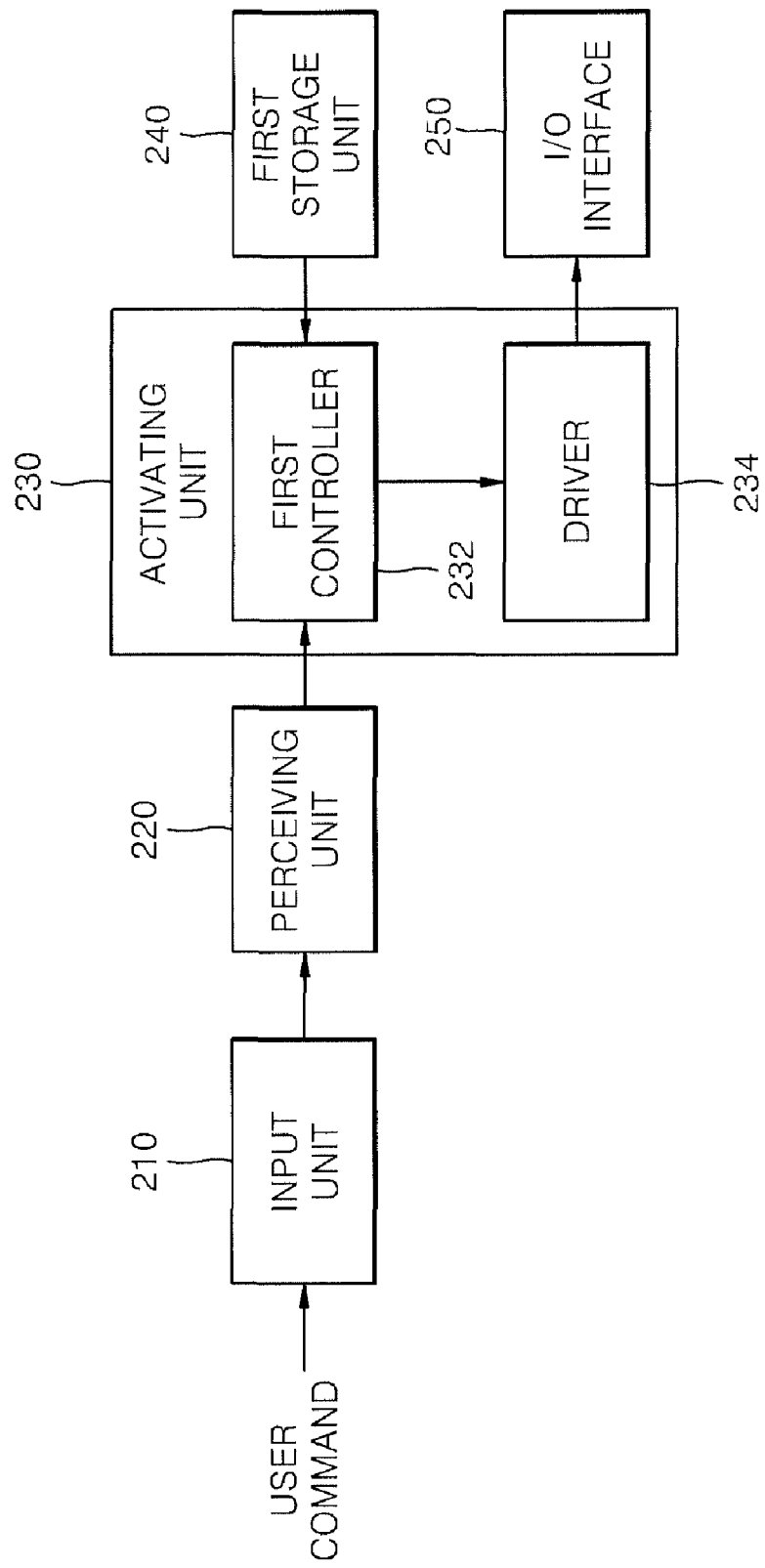
FIG. 2 is a block diagram illustrating an I/O interface control apparatus according to an embodiment of the present invention.

FIG. 2 is a block diagram illustrating an apparatus to control an input/output (I/O) interface according to an embodiment of the present invention. Referring to FIG. 2, the apparatus includes an input unit 210, a perceiving unit 220, an activating unit 230, and a first storage unit 240, and an I/O (input/output) interface 250.

A user command that instructs a predetermined functional mode to be selected from among a plurality of functional modes of a mobile terminal, such as a PDA and a cellular phone, is input to the apparatus via the input unit 210. The user command may be input by various methods such as, for example, using a surface region of the mobile terminal that a user contacts, the movement of the mobile terminal, or the voice of a user. A method of inputting the user command according to the present invention is not limited to the above description, that is, the user command can be input through various methods.

The perceiving unit 220 perceives a functional mode corresponding to the user command from among a plurality of functional modes of the mobile terminal. The perceiving unit 220 may include a predetermined microcomputer (not shown) that processes an operation to perceive the functional mode corresponding to the user command, based on a reference perception model. The perceiving unit 220 may further include a storage unit (not shown) that stores the reception model, or a storage medium that stores the reception model may be provided in the mobile terminal. A construction of the perceiving unit 220 according to an embodiment of the present invention will be described in greater detail with reference to FIGS. 4 through 6.

The activating unit 230 may include a first controller 232 and a driver 234, and activates an I/O interface 250 that provides the user with a sense of physical contact corresponding to the perceived functional mode. Here, the sense of physical contact sensed when the user touches the I/O interface 250 is different from that sensed when the user touches the body of the mobile terminal. The sense of physical contact may be generated from, for example, a sense of pressure, a sense of pain, a muscular sense (hardness or softness), a touch sense (roughness or softness), a sense of cold, or a sense of heat. The sense of physical contact may also be generated when touching a button projecting from the mobile terminal, or a material giving a sense of contact that is different from that of the body of the mobile terminal. When the functional mode corresponding to the user command is perceived via the perceiving unit 220, the first controller 232 controls only an I/O interface 250 related to the perceived functional mode to be activated in the mobile terminal. The driver 234 may be an electric motor, such as a DC motor or a piezzo motor, which is driven by a control signal output from the first controller 232; or a vibrating unit, such as a vibrating motor and a vibrating film, which uses a vibrating force. The driver 234 may generate the sense of physical contact by mechanically changing an electric signal, and the user may perceive the I/O interface 250 through the sense of physical contact that is different from that of the body of the mobile terminal. However, the type of the driver 234 is not limited to the above description.

An I/O interface 250 activated by the driver 234 may include a housing, such as a button projecting from the body of the mobile terminal, and a switch (not shown) that activates a predetermined function mapped to the housing the driver 234 in response to the user pressing the housing.

Figure 3:
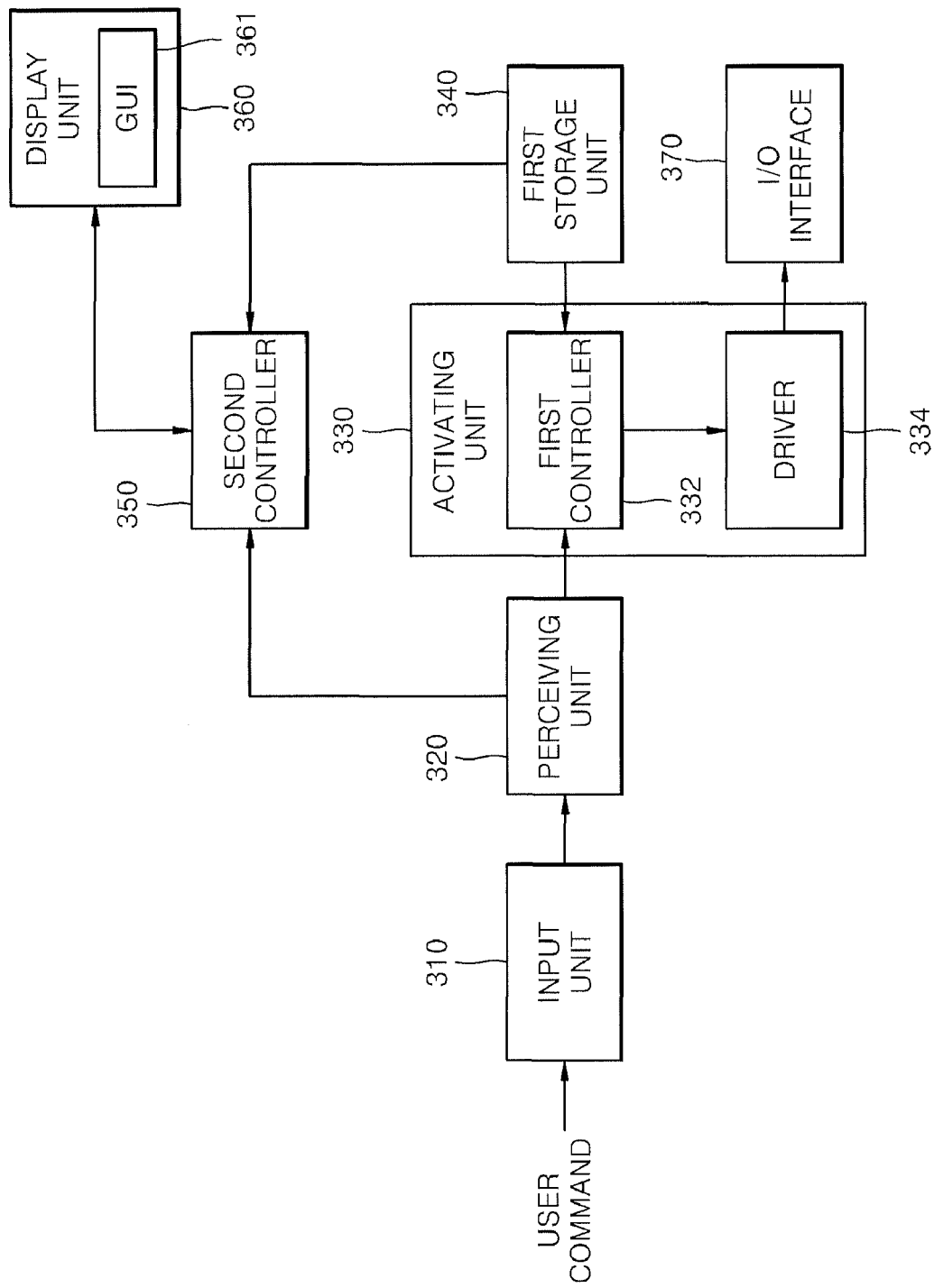
FIG. 3 is a block diagram illustrating an I/O interface control apparatus according to another embodiment of the present invention.

FIG. 3 is a block diagram illustrating an apparatus to control an I/O interface according to another embodiment of the present invention. Referring to FIG. 3, the apparatus includes an input unit 310, a perceiving unit 320, an activating unit 330, a first storage unit 340, a second controller 350, a display unit 360, and an I/O interface 370. The activating unit 330 may include a first controller 332 and a driver 334, and the display unit 360 may include a GUI (Graphic User Interface) 361. The operations of the input unit 310, perceiving unit 320, activating unit 330, and I/O interface 370 may be substantially the same as those of the input unit 210, perceiving unit 220, activating unit 230, and I/O interface 250 illustrated in FIG. 2, respectively.

The first storage unit 340 stores not only I/O interface models to be activated by the activating unit 230, but also graphic user interface models to be displayed on the display unit 360. The second controller 350 controls a graphic user interface model that is stored in the first storage unit 340, and which corresponds to the functional mode to be displayed in the display unit 360, based on the functional mode perceived by the perceiving unit 320. The apparatus of FIG. 3 allows the graphic user interface 361 and the I/O interface 370 to be activated automatically and simultaneously based on the functional mode perceived by the perceiving unit 330.

Figure 4:
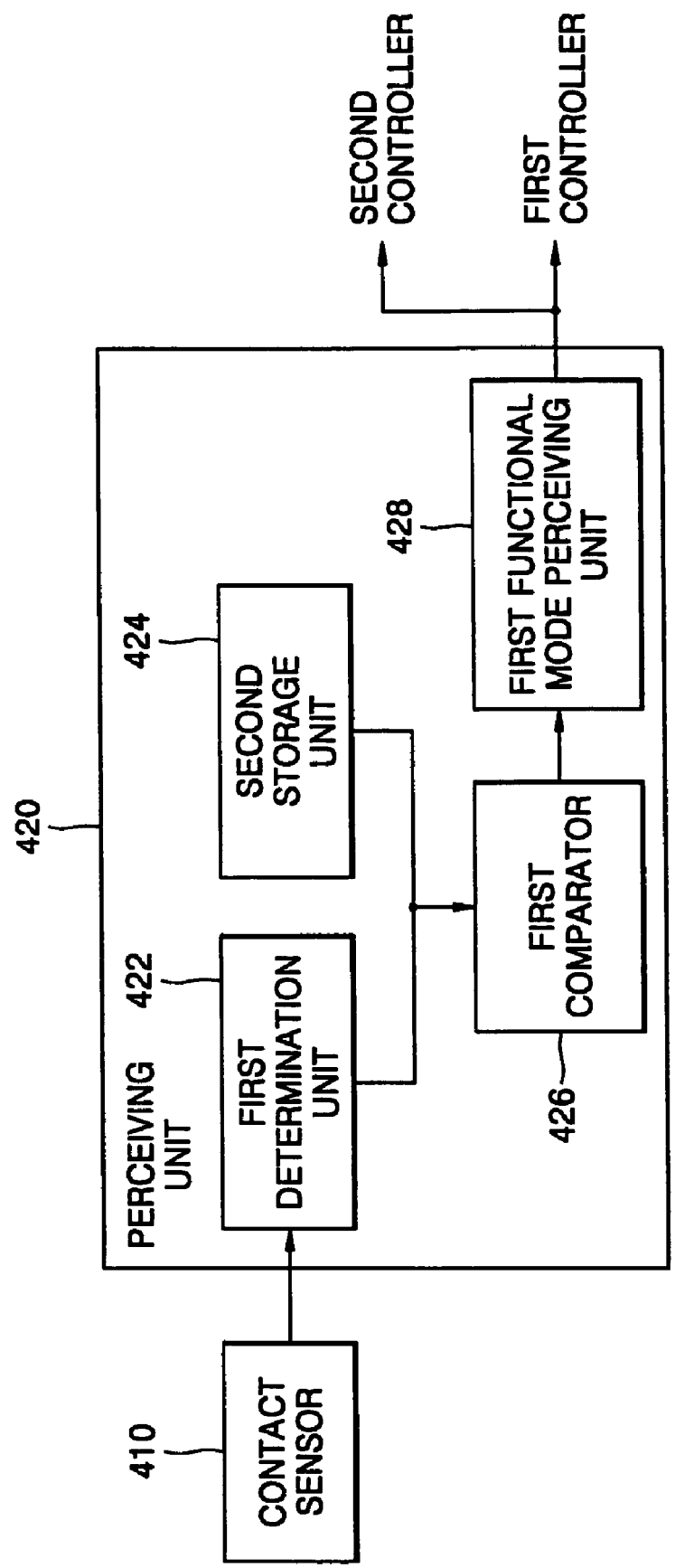
FIG. 4 is a detailed block diagram illustrating a perceiving unit of an I/O interface control apparatus, which receives a user command via a contact sensor according to an embodiment of the present invention.

FIG. 4 is a detailed block diagram of a perceiving unit 420 of an I/O interface apparatus, which receives a user command via at least one contact sensor 410, according to an embodiment of the present invention. Referring to FIG. 4, the I/O interface apparatus includes the at least one contact sensor 410, a perceiving unit 420, an activating unit (not shown), a first storage unit (not shown), a second controller (not shown), and a display unit (not shown). The operations of the activating unit, the first storage unit, the second controller, and the display unit may be substantially the same as those of the activating unit 330, first storage unit 340, second controller 350, and display unit 360 illustrated in FIG. 3, respectively.

The at least one contact sensor 410 is provided on a mobile terminal, and a user command that selects a desired functional mode is input to the perceiving unit 420 according to whether a user contacts the mobile terminal, the user command being sensed by the at least one contact sensor 410. Specifically, the at least one contact sensor 410 senses whether the user contacts a predetermined region of the mobile terminal, and generates a sensing signal according to the result of sensing. The at least one contact sensor 410 may be, for example, a pressure sensor or a thermosensor. The type of the at least one contact sensor 410 may be determined according to a field to which the present invention belongs.

The perceiving unit 420 includes a first determination unit 422, a second storage unit 424, a first comparator 426, and a first functional mode perceiving unit 428, and determines a functional mode corresponding to the user command in response to the sensing signal output from the at least one contact sensor 410. The first determination unit 422 receives sensing signals output from the at least one contact sensor 410 and determines the predetermined region that the user contacted according to the result the sensing signals. The second storage unit 424 stores a perception model used to perceive a functional mode corresponding to the determined region. The first comparator 426 compares the region determined by the first determination unit 422 with the perception model stored in the second storage unit 424. The first functional mode perceiving unit 428 perceives the functional mode corresponding to the determined region, based on the result of comparison output from the first comparator 426. The first and second controllers of the activating unit control a graphic user interface and an I/O interface to be activated according to the result of the perceiving by the perceiving unit 420.

Figure 5:
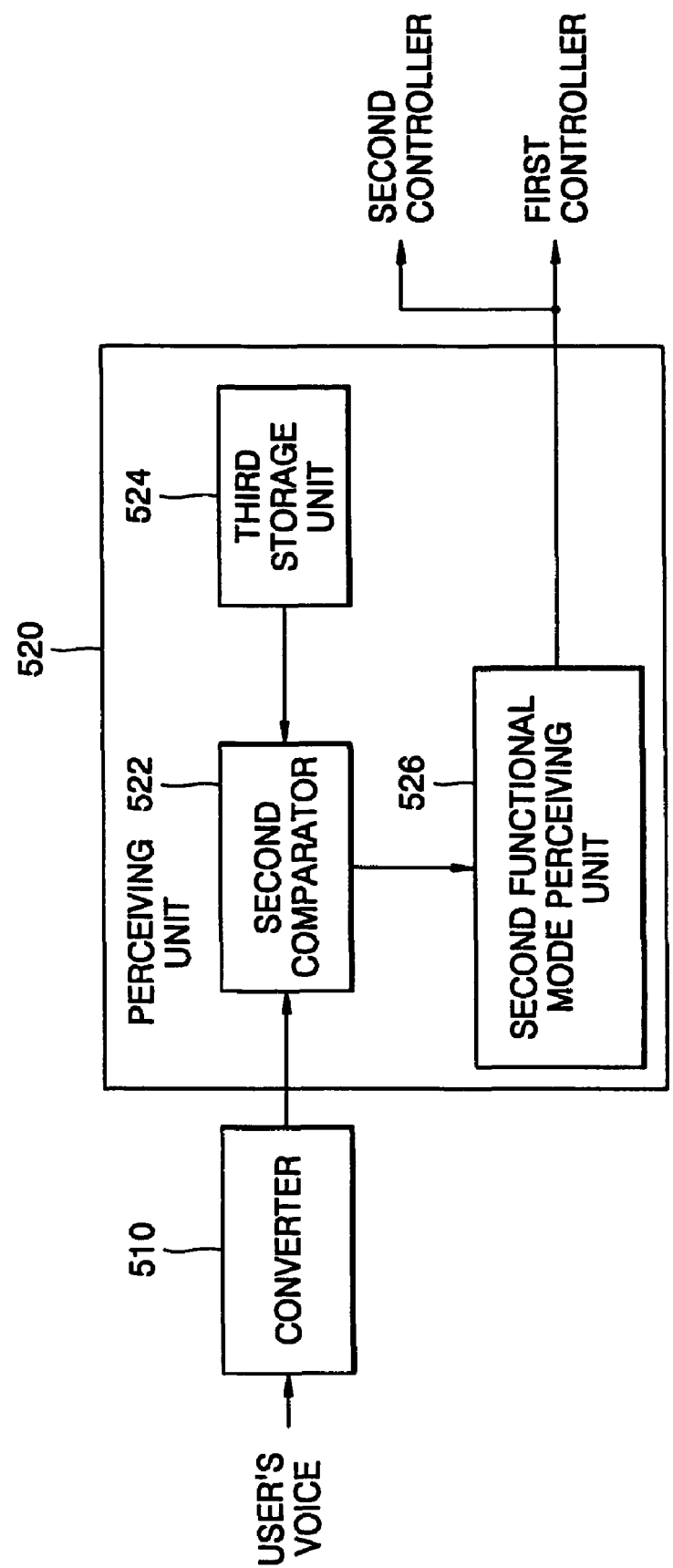
FIG. 5 is a detailed block diagram illustrating a perceiving unit of an I/O interface control apparatus, which receives a user command from a user's voice according to an embodiment of the present invention.

FIG. 5 is a detailed block diagram illustrating a perceiving unit 520 of an I/O interface apparatus, which receives a user command from a user's voice according to an embodiment of the present invention. Referring to FIG. 5, the I/O interface apparatus includes a converter 510, a perceiving unit 520, an activating unit (not shown), a first storage unit (not shown), a second controller (not shown), and a display unit (not shown). The operations of the activating unit, the first storage unit, the second controller, and the display unit may be substantially the same as those of the activating unit 330, first storage unit 340, second controller 350, and display unit 360 illustrated in FIG. 3, respectively.

The user inputs a user command that selects a predetermined functional mode from among a plurality of functional modes integrated into the mobile terminal, using his/her voice. The converter 510 converts the user's voice into an electric signal. The electric signal output from the converter 510 is a signal with a predetermined, basic frequency corresponding to one of the functional modes.

The perceiving unit 520 may include a second comparator 522, a third storage unit 524, and a second functional mode perceiving unit 526, and perceives the functional mode corresponding to the electric signal output from the converter 510. The third storage unit 524 stores a perception model used to perceive the functional mode corresponding to the electric signal. The second comparator 522 compares the electric signal output from the converter 510 with the perception model stored in the third storage unit 524. The second functional mode perceiving unit 526 perceives the functional mode corresponding to the user's voice from among the plurality of functional modes provided to the mobile terminal, based on the result of comparison of the second comparator 522. The first and second controllers of the activating unit control a graphic user interface and an I/O interface to be activated according to the result of the perceiving by the perceiving unit 520.

Figure 6:
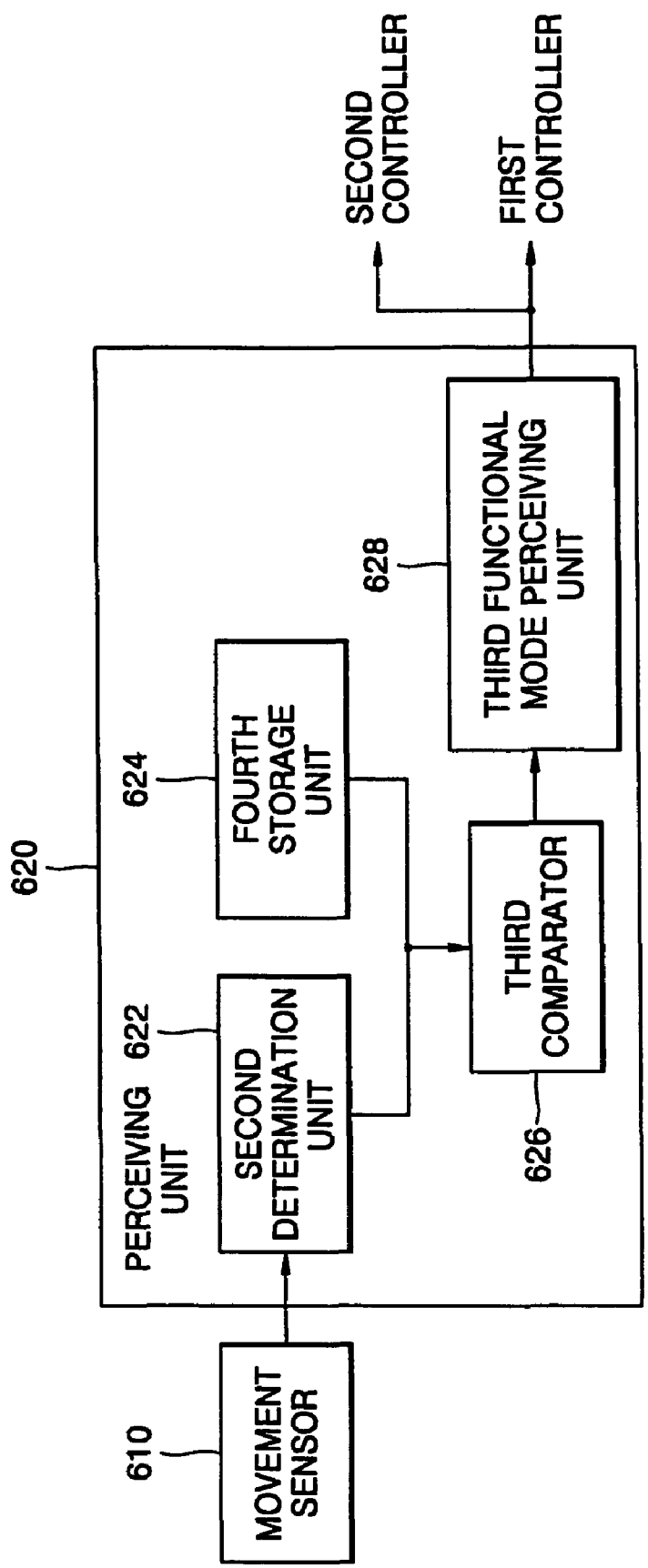
FIG. 6 is a detailed block diagram illustrating a perceiving unit of an I/O interface control apparatus, which receives a user command from the movement of a mobile terminal according to an embodiment of the present invention.

FIG. 6 is detailed block diagram illustrating a perceiving unit 620 of an I/O interface apparatus, which receives a user command from the movement of a mobile terminal according to an embodiment of the present invention. Referring to FIG. 6, the I/O interface apparatus includes a movement sensor 610, a perceiving unit 620, an activating unit (not shown), a first storage unit (not shown), a second controller (not shown), and a display unit (not shown). The operations of the activating unit, the first storage unit, the second controller, and the display unit may be substantially the same as those of the activating unit 330, first storage unit 340, second controller 350, and display unit 360 illustrated in FIG. 3, respectively.

Referring to FIG. 6, a user command that selects a predetermined functional mode from among a plurality of functional modes integrated into the mobile terminal is input to the perceiving unit 620, using the movement of the mobile terminal sensed by the movement sensor 610. The movement sensor 610 may sense the movement of the mobile terminal by measuring the angle of rotation of the mobile terminal with respect to a predetermined axis of the mobile terminal, or the angle between the direction of gravitation of the mobile terminal and the predetermined axis, and generates a sensing signal according to the result of sensing. The movement sensor 610 may be, for example, a terrestrial sensor, a magnetic sensor, an acceleration sensor, an angle velocity sensor, an angle acceleration sensor, or a combination thereof. Also, the type of the movement sensor 610 may be determined according to a field to which the present invention belongs.

The perceiving unit 620 may include a second determination unit 622, a fourth storage unit 624, a third comparator 626, and a third functional mode perceiving unit 628, and perceives a functional mode corresponding to the sensed movement of the mobile terminal. The second determination unit 622 determines the movement of the mobile terminal from the sensing signal output from the movement sensor 610. The second determination unit 622 determines the angle of rotation of the mobile terminal, or the angle between the direction of gravitation and the predetermined axis, using the sensing signal. The fourth storage unit 624 stores a perception model used to perceive a functional mode corresponding to the movement of the mobile terminal. The third comparator 626 compares the movement determined by the second determination unit 622 with the perception model stored in the fourth storage unit 624. The third functional mode perceiving unit 628 perceives the functional mode corresponding to the determined movement, according to the result of the comparison output from the third comparator 626.

The first and second controllers of the activating unit control a graphic user interface and an I/O interface to be activated according to the result of the perceiving by the perceiving unit 620.

Figure 7:
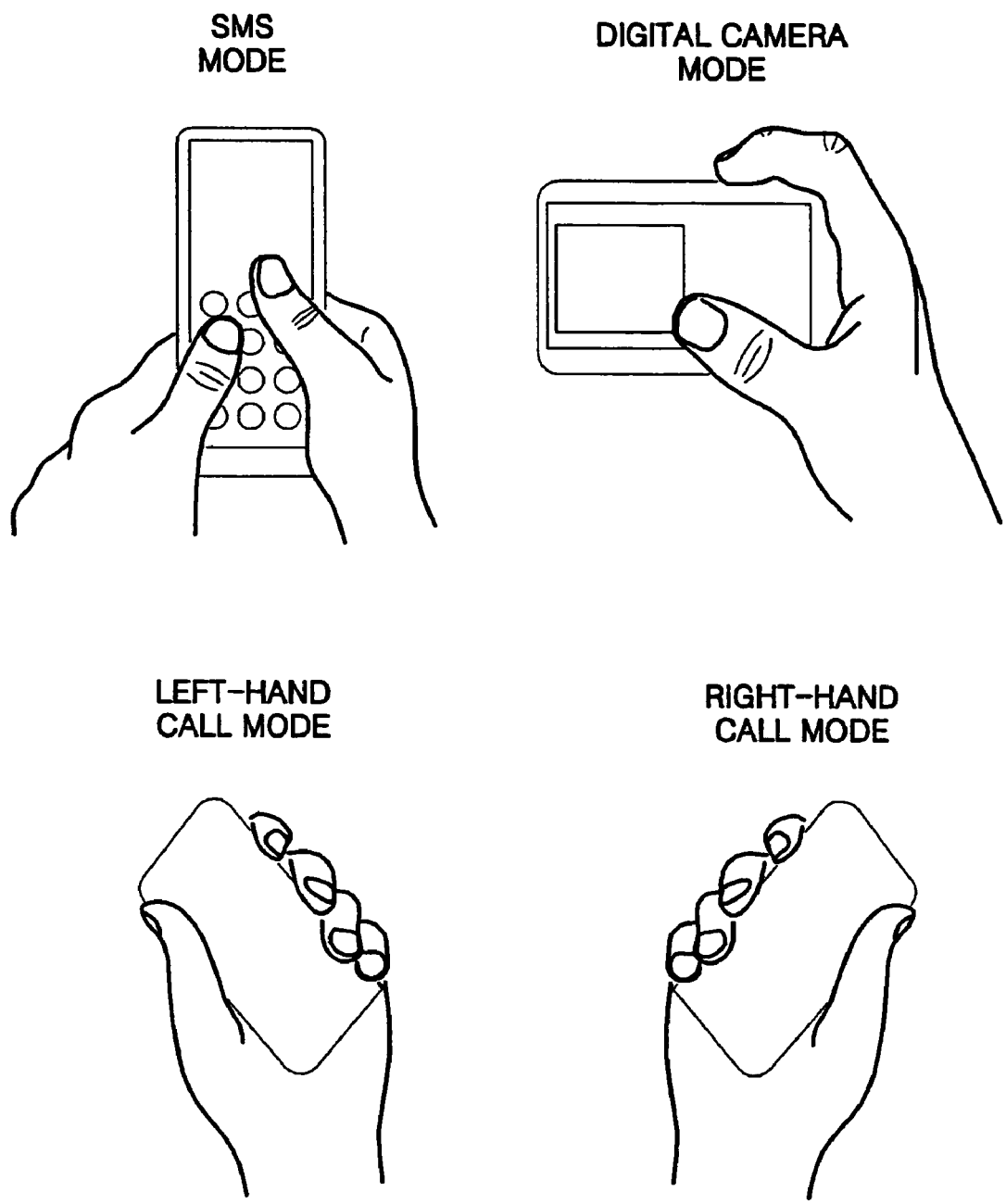
FIG. 7 illustrates examples of a seizure pattern by which a user seizes a mobile terminal, which correspond to a plurality of functional modes of the mobile terminal which are integrated into an I/O interface apparatus that receives a user input via a contact sensor or a movement sensor according to an embodiment of the present invention.

FIG. 7 illustrates examples of a grip pattern by which a user holds a mobile terminal, which correspond to a plurality of functional modes of the mobile terminal which are integrated into an I/O interface apparatus that receives a user input via a contact sensor or a movement sensor according to an embodiment of the present invention. Referring to FIG. 7, the user grips the mobile terminal according to various grip patterns to select a desired functional mode from among the plurality of functional modes. A region of the mobile terminal that the user contacts, the angle of rotation of the mobile terminal, and the angle between the direction of gravitation and a predetermined axis of the mobile terminal vary according to the grip pattern.

Figure 8:
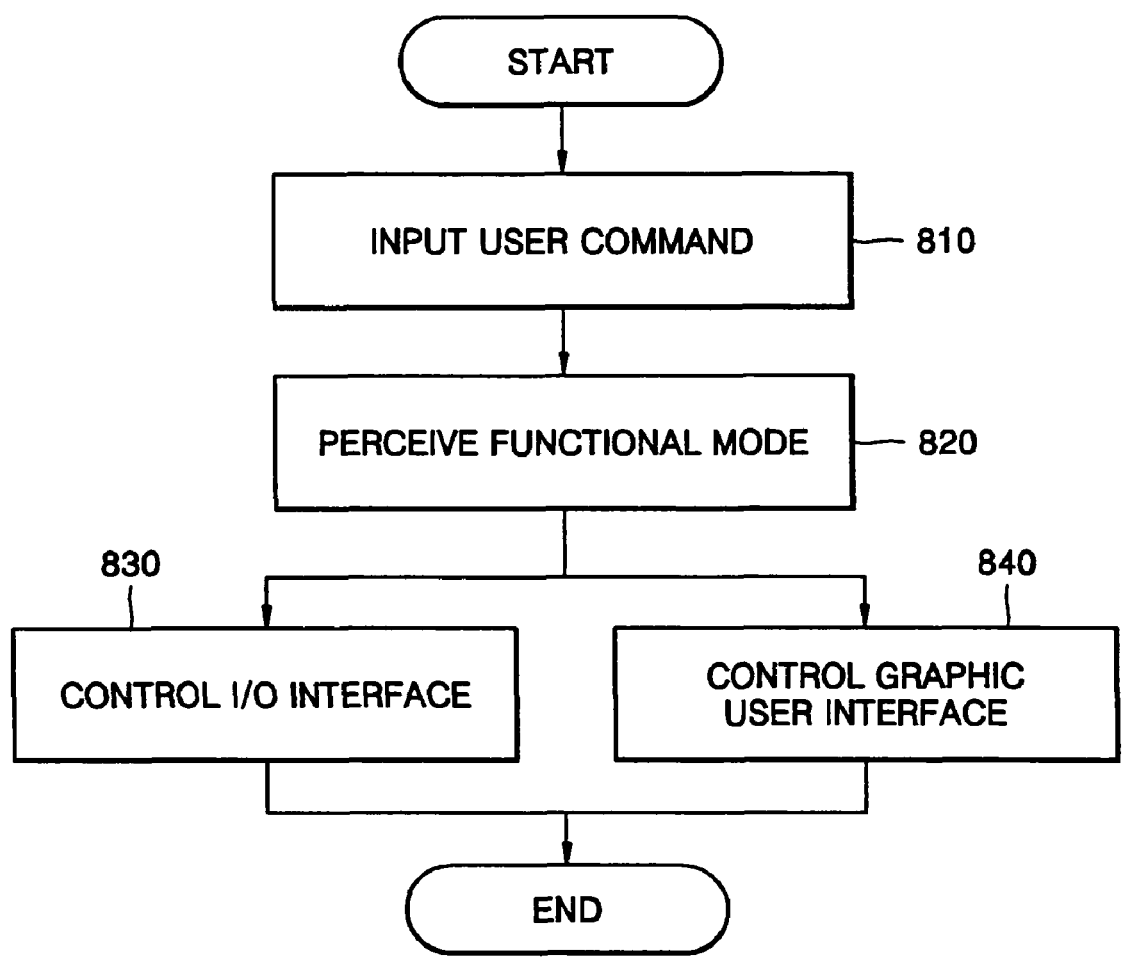
FIG. 8 is a flowchart illustrating an I/O interface control method according to an embodiment of the present invention.

FIG. 8 is a flowchart illustrating an I/O interface control method according to an embodiment of the present invention. Referring to FIG. 8, a user command that selects a functional mode of a mobile terminal from among a plurality of functional modes of the mobile terminal is input (operation 810). The user command may be input using, for example, a region of the mobile terminal that a user contacts, the movement of the mobile terminal, or the user's voice. Next, a functional mode according to the user command is perceived (operation 820). Next, an I/O interface corresponding to the perceived functional mode is controlled to be activated (operation 830).

Next, a graphic user interface corresponding to the perceived functional mode is controlled to be displayed on a display unit (operation 840).

A control signal is generated to activate an I/O interface of an I/O interface model corresponding to the perceived functional mode, and the I/O interface is driven by the control signal. Also, a control signal is generated to activate a graphic user interface of a graphic user interface model corresponding to the perceived functional mode, and the graphic user interface is displayed on the display unit in response to the control signal.

Figure 9:
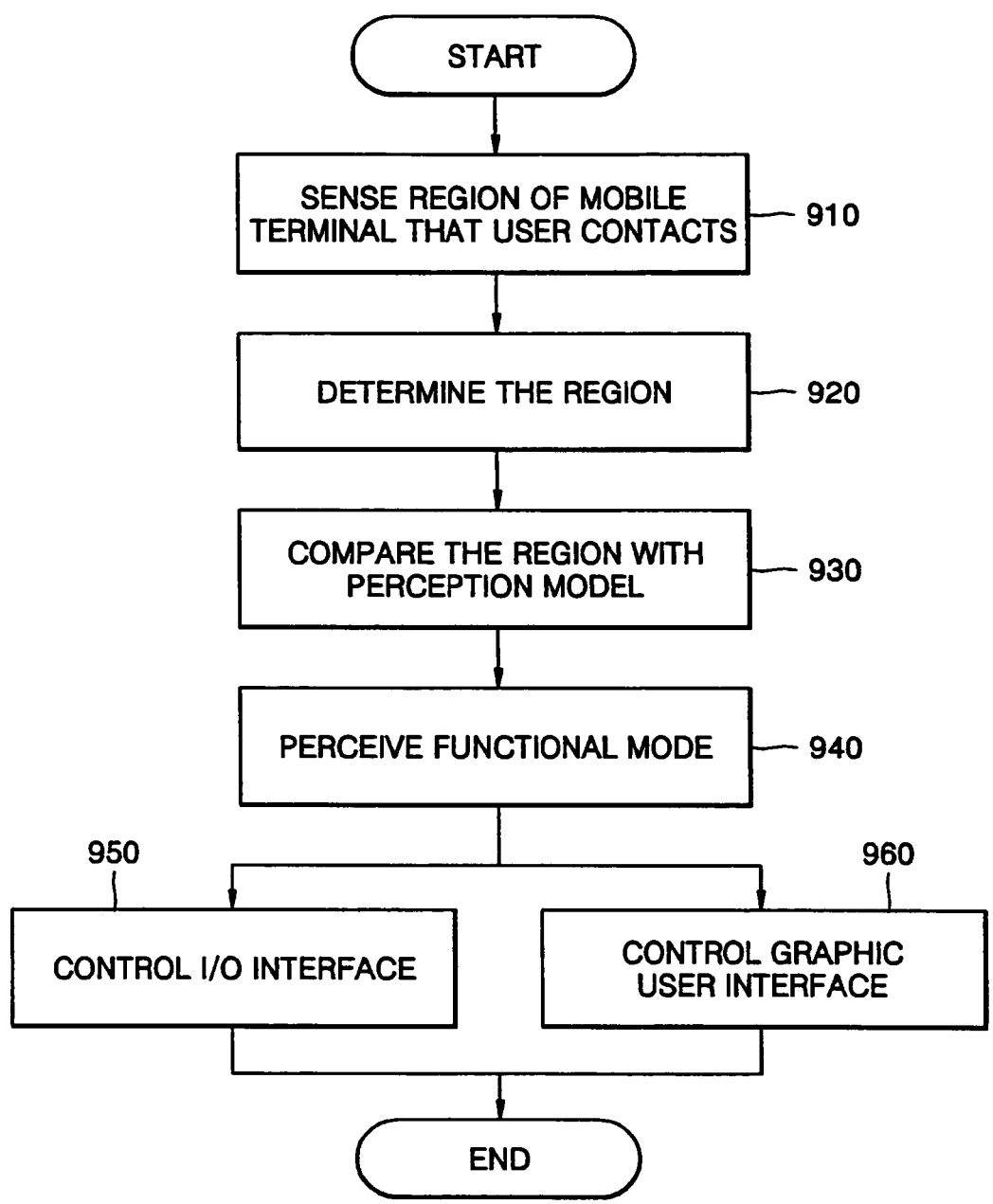
FIG. 9 is a flowchart illustrating a method of controlling an I/O interface that receives a user command using a surface region of a mobile terminal that a user contacts according to an embodiment of the present invention.

FIG. 9 is a flowchart illustrating a method of controlling an I/O interface that receives a user command according to a region of a mobile terminal that a user contacts, according to an embodiment of the present invention. Referring to FIG. 9, whether the user contacts the predetermined region is sensed, and a sensing signal corresponding to the result of the sensing is generated (operation 910). Next, the region of the mobile terminal that the user contacts is determined from at least one sensing signal (operation 920). Next, the determined region is compared with a perception model used to perceive a functional mode corresponding to the determined region (operation 930). Next, a functional mode corresponding to a user command input using the determined region is perceived according to the result of the comparison (operation 940). Next, an I/O interface corresponding to the perceived functional mode is controlled to be activated (operation 950), and/or a graphic user interface corresponding to the perceived functional mode is controlled to be activated (operation 960).

Figure 10:
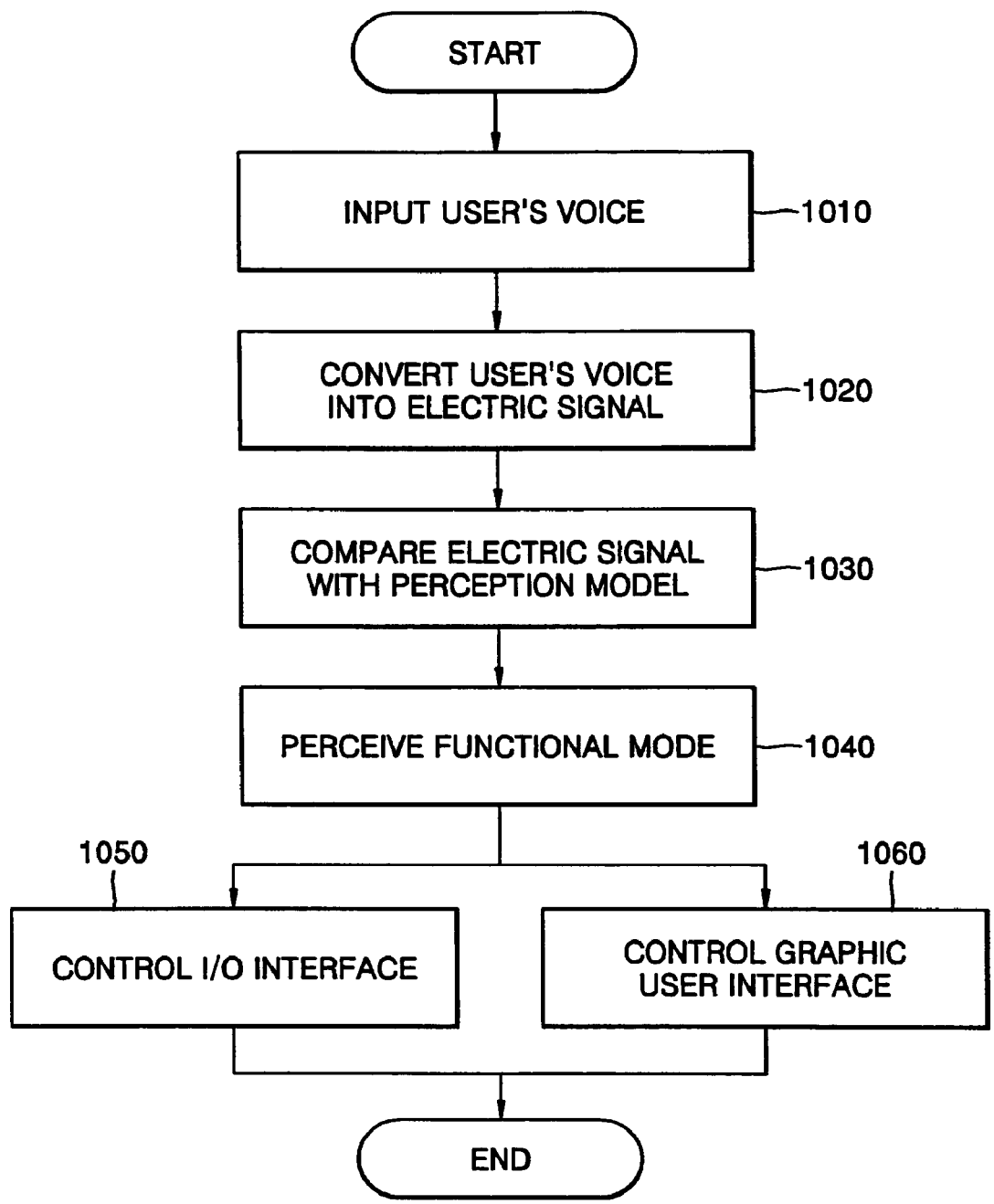
FIG. 10 is a flowchart illustrating a method of controlling an I/O interface which receives a user command from the voice of a user according to an embodiment of the present invention.

FIG. 10 is a flowchart illustrating a method of controlling an I/O interface that receives a user command from a user's voice according to an embodiment of the present invention. Referring to FIG. 10, the user's voice that selects a predetermined functional mode from among a plurality of functional modes of a mobile terminal is input (operation 1010), and the user's voice is converted into an electric signal (operation 1020). Next, the electric signal is compared with a perception model used to perceive a functional mode corresponding to the electric signal (operation 1030). Next, a functional mode corresponding to a user command input using the user's voice is perceived, based on the result of the comparison (operation 1040). Next, an I/O interface corresponding to the perceived functional mode is controlled to be activated (1050), and/or a graphic user interface corresponding to the perceived functional mode is controlled to be activated (operation 1060).

Figure 11:
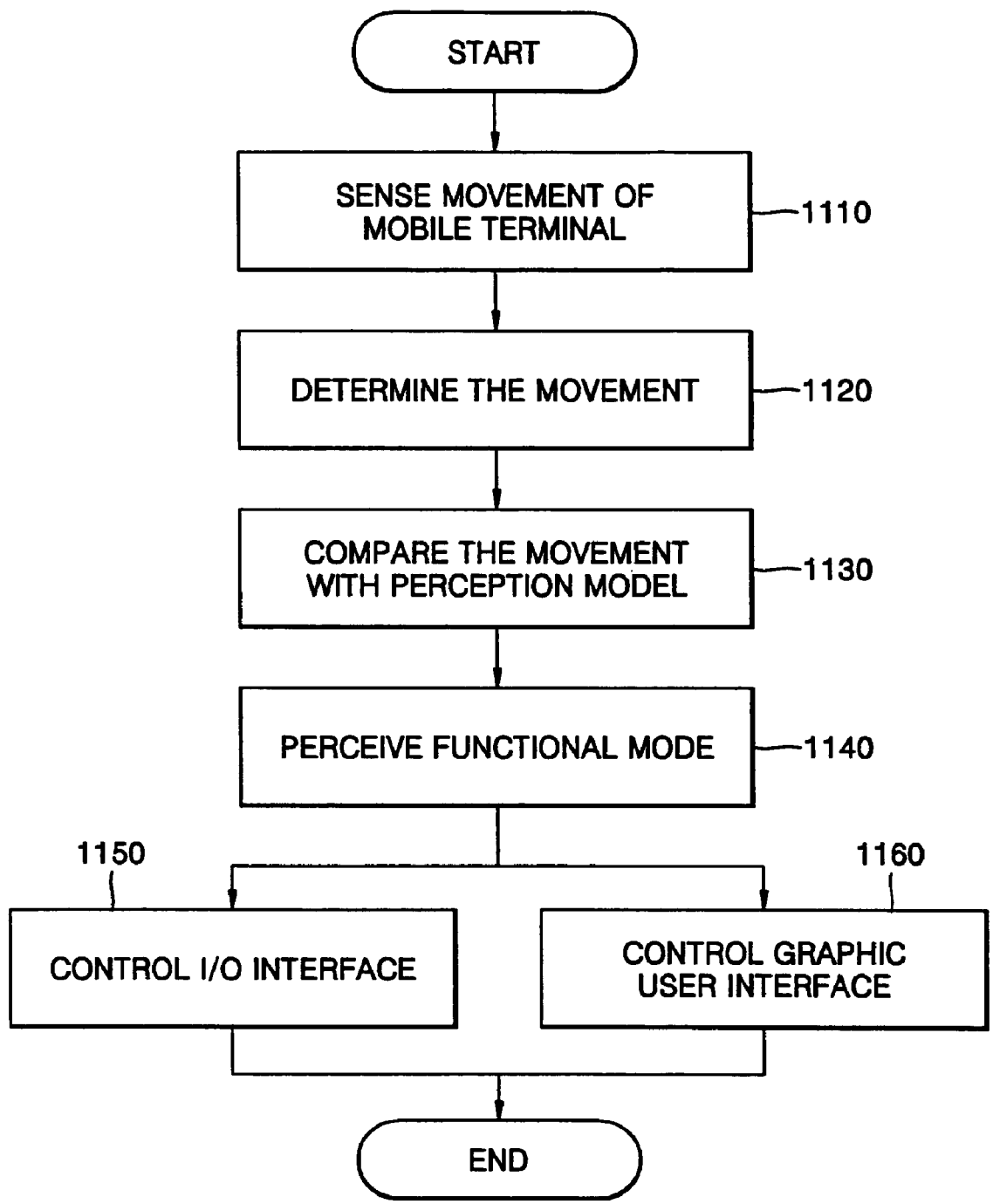
FIG. 11 is a flowchart illustrating a method of controlling an I/O interface that receives a user command from the movement of a mobile terminal according to an embodiment of the present invention.

FIG. 11 is a flowchart illustrating a method of controlling an I/O interface that receives a user command from the movement of a mobile terminal according to an embodiment of the present invention. Referring to FIG. 11, movement of the mobile terminal is sensed by, for example, the angle of rotation of the mobile terminal with respect to a predetermined axis of the mobile terminal, or the angle between the angle of gravitation and the predetermined axis, and a sensing signal corresponding to the result of the sensing is generated (operation 1110). Next, the type of movement of the mobile terminal is determined from the sensing signal (operation 1120). Next, the determined movement is compared with a perception model used to perceive a functional mode corresponding to the determined movement (operation 1130). Next, a functional mode corresponding to the user command input using the movement of the mobile terminal is perceived according to the result of the comparison (operation 1140). Next, an I/O interface corresponding to the perceived functional mode is controlled to be activated (operation 1150), and/or a graphic user interface corresponding to the perceived functional mode is controlled to be activated (operation 1160).

In addition to the above-described embodiments, the method of the present invention can also be implemented by executing computer readable code/instructions in/on a medium, e.g., a computer readable medium. The medium can correspond to any medium/media permitting the storing and/ or transmission of the computer readable code. The code/ instructions may form a computer program.

The computer readable code/instructions can be recorded/ transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. The medium may also be a distributed network, so that the computer readable code/instructions is stored/transferred and executed in a distributed fashion. The computer readable code/instructions may be executed by one or more processors.

An I/O interface control apparatus according to the present invention is capable of perceiving a functional mode corresponding to a user command input using, for example, a region of a mobile terminal that a user contacts, a movement of the mobile terminal, and/or the user's voice, and driving only an I/O interface corresponding to the perceived functional mode, thereby realizing a small, light, and thin mobile terminal.

The I/O interface control apparatus allows a functional mode corresponding to an input user command to be automatically perceived, and a graphic user interface and an I/O interface corresponding to the perceived functional mode to be automatically activated, thereby reducing efforts and time required to activate a graphic user interface and an I/O interface corresponding to a predetermined functional mode.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus to control an interface, which includes an input/output interface and a graphic user interface, of a mobile terminal which receives a user command, comprising:
    an input unit to receive the user command for selecting a functional mode of the mobile terminal from plural functional modes of the mobile terminal;
    a perceiving unit to perceive the functional mode selected by the user command; and
    an activating unit to selectively activate the input/output interface to provide a sense of physical contact to the user, based on the functional mode perceived by the perceiving unit,
    wherein the input/output interface and the graphic user interface are activated simultaneously based on the functional mode perceived by the perceiving unit, and the functional mode being selected from among the plural functional modes including an SMS mode and a call mode,
    wherein the input/output interface is one of an output interface and an input and output interface.

2. The apparatus of claim 1, wherein the activating unit comprises:
    a first controller to control the input/output interface corresponding to the functional mode perceived by the perceiving unit to be activated; and
    a driver to generate the sense of physical contact to the user upon activation by the first controller.

3. The apparatus of claim 1, wherein the sense of physical contact is provided using a sense of pressure, a sense of pain, a muscular sense, a touch sense, a sense of cold, a sense of heat, the button projecting from the body of the mobile terminal, a material giving a sense of contact that is different from a sense of contact of the mobile terminal, or a combination thereof.

4. The apparatus of claim 3, further comprising a second controller to control the graphic user interface of the mobile device corresponding to the functional mode perceived by the perceiving unit to be activated.

5. The apparatus of claim 4, further comprising a first storage unit to store at least one graphic user interface model and at least one input/output interface model corresponding to the functional mode perceived by the perceiving unit;
    wherein the second controller controls the graphic user interface to be activated based on the graphic user interface model stored in the first storage unit; and
    the first controller controls the input/output interface to be activated based on the input/output interface model stored in the first storage unit.

6. The apparatus of claim 5, wherein the received user command is input using a region of the mobile terminal that the user contacts; and
    the input unit comprises at least one sensor to sense whether the user contacts the region of the mobile terminal.

7. The apparatus of claim 6, wherein the perceiving unit comprises:
    a determination unit to receive at least one sensing signal output from the at least one sensor and to determine the region of the mobile terminal that the user contacts from the result of the at least one received sensing signal;
    a second storage unit to store a perception model for perceiving a functional mode corresponding to the determined region;
    a comparator to compare the determined region with the perception model stored in the second storage unit; and
    a functional mode perceiving unit to perceive the selected functional mode corresponding to the determined region, according to a result of the comparison by the comparator.

8. The apparatus of claim 5, wherein the received user command is input using the user's voice, and the input unit comprises a converter to convert the input user's voice into an electric signal.

9. The apparatus of claim 8, wherein the perceiving unit comprises:
    a second storage unit to store a perception model for perceiving a functional mode corresponding to the electric signal;
    a comparator to compare the electric signal with the perception model stored in the second storage unit; and
    a functional mode perceiving unit to perceive the selected functional mode corresponding to the input user's voice, according to the result of the comparison by the comparator.

10. The apparatus of claim 5, wherein the received user command is input through movement of the mobile terminal measured with respect to a predetermined axis of the mobile terminal; and
    the input unit comprises a movement sensor to sense a movement of the mobile terminal.

11. The apparatus of claim 10, wherein the perceiving unit comprises:

a determination unit to determine the movement of the mobile terminal using a sensing signal output from the movement sensor;

a second storage unit to store a perception model used for perceiving a functional mode corresponding to the determined movement;

a comparator to compare the determined movement with the perception model stored in the second storage unit; and a functional mode perceiving unit to perceive the selected functional mode corresponding to the determined movement, according to the comparison by the comparator.

12. A method of controlling an interface, which includes an input/output interface and a graphic user interface, of a mobile terminal which receives a user command, the method comprising:

receiving the user command for selecting a functional mode of the mobile terminal from plural functional modes of the mobile terminal;

perceiving the functional mode selected by the user command; and controlling the input/output interface to selectively provide a sense of physical contact to the user based on the functional mode perceived in the perceiving of the functional mode, wherein the input/output interface and the graphic user interface are controlled to activate simultaneously based on the functional mode perceived in the perceiving of the functional mode, and the functional mode being selected from among the plural functional modes including an SMS mode and a call mode, wherein the input/output interface is one of an output interface and an input and output interface.

13. The method of claim 12, wherein the controlling of the input/output interface comprises:

generating a control signal which controls the input/output interface corresponding to the functional mode perceived in the perceiving of the functional mode; and driving the input/output interface corresponding to the functional mode perceived in the perceiving of the functional mode to be activated in response to the control signal.

14. The method of claim 12, wherein the sense of physical contact is provided using vibration of the mobile terminal, the button projecting from the mobile terminal, or a combination thereof.

15. The method of claim 14, further comprising controlling the graphic user interface corresponding to the functional mode perceived in the perceiving of the functional mode to be displayed.

16. The method of claim 15, wherein the received user command is input using a region of the mobile terminal that the user contacts; and the receiving of the user command comprises sensing the region of the mobile terminal that the user contacts.

17. The method of claim 16, wherein the perceiving of the functional mode comprises:

determining the region of the mobile terminal from at least one sensed signal;

comparing the determined region with a perception model for perceiving a functional mode, from the plural functional modes, corresponding to the determined region; and perceiving the selected functional mode corresponding to the determined region according to the comparison.

18. The method of claim 15, wherein the user command is input using the user's voice; and the receiving of the user command comprises converting the input user's voice into an electric signal.

19. The method of claim 18, wherein the perceiving of the functional mode comprises:

comparing the electric signal with a perception model for perceiving a functional mode, from the plural functional modes, corresponding to the electric signal; and perceiving the functional mode perceived in the perceiving of the functional mode corresponding to the user's voice according to the comparison.

20. The method of claim 15, wherein the user command is input through movement of the mobile terminal with respect to a predetermined axis of the mobile terminal; and the receiving of the user command comprises sensing the movement of the mobile terminal.

21. The method of claim 20, wherein the perceiving of the functional mode comprises:

determining the movement of the mobile terminal according to the sensing of the movement of the mobile terminal;

comparing the determined movement with a perception model for perceiving a functional mode, from the plural functional modes, corresponding to the determined movement; and perceiving the functional mode perceived in the perceiving of the functional mode corresponding to the determined movement according to the comparison.

22. A non-transitory computer readable storage medium storing instructions that control at least one processor to perform a method of controlling an interface, which includes an input/output interface and a graphic user interface, of a mobile terminal which receives a user command, the method comprising:

receiving the user command for selecting a functional mode of the mobile terminal from plural functional modes of the mobile terminal;

perceiving the functional mode selected by the user command; and controlling the input/output interface to provide a sense of physical contact to the user based on the functional mode perceived in the perceiving of the functional mode, wherein the input/output interface and the graphic user interface are controlled to activate simultaneously based on the functional mode perceived in the perceiving of the functional mode, and the functional mode being selected from among the plural functional modes including an SMS mode and a call mode, wherein the input/output interface is one of an output interface and an input and output interface.

23. An apparatus to control an interface, which includes an input/output interface and graphic user interface, of a mobile terminal which receives a user command, comprising:

an input unit to receive the user command for selecting a functional mode of the mobile terminal from plural functional modes of the mobile terminal; and a controller to selectively provide a physical sensation to the user based on the functional mode selected according to the user command, wherein input/output interface and the graphic user interface are controlled to activate simultaneously based on the functional mode perceived in the perceiving of the functional mode, and the functional mode being selected from among the plural functional modes including an SMS mode and a call mode, wherein the input/output interface is one of an output interface and an input and output interface.

24. The apparatus of claim 23, further comprising a perceiving unit to perceive the functional mode of the mobile terminal corresponding to the user command.

25. An apparatus to control at least an output of an interface between a user and a mobile terminal that receives a user command by the user for a functional mode of the mobile terminal, comprising:
- an input unit to receive the user command for selecting the functional mode of the mobile terminal from plural functional modes of the mobile terminal; and
- a controller to selectively provide a physical sensation to the user using a button projecting from the mobile terminal, based on a result of a determination of which of the plural functional modes, as a determined functional mode, has been selected by the user according to the received user command, in addition to any operation of the select functional mode by the mobile terminal,
- wherein the determined functional mode is determined according to a detected physical orientation of the mobile terminal, as the received user command, relative to a gravitational pull.

26. The apparatus of claim 25, wherein the physical sensation corresponds to the selected functional mode.

27. An apparatus to control an interface between a user and a mobile terminal which receives a user command by the user for a functional mode of the mobile terminal, comprising:
- an input unit to receive the user command for selecting the functional mode of the mobile terminal from plural functional modes of the mobile terminal; and
- a controller to selectively provide a physical sensation to the user using a button projecting from the mobile terminal, based on a determination of which of the plural functional modes, as a determined functional mode, has been selected by the user according to the received user command, in addition to any operation of the select functional mode by the mobile terminal,
- wherein the selected functional mode is determined according to a movement of the mobile terminal, as the user command, relative to a gravitational pull and the functional mode being selected from among the plural functional modes including an SMS mode and a call mode.

28. The apparatus of claim 27, wherein the physical sensation corresponds to the selected functional mode.

29. A method of controlling an input/output interface of a mobile terminal that receives a user command, the method comprising:
- receiving the user command for selecting a functional mode of the mobile terminal from plural functional modes of the mobile terminal; and
- selectively providing a physical sensation to the user based on a determination of which of the plural functional modes is selected according to the user command,
- wherein the physical sensation is provided when a result of the determination indicates that the selected functional mode has been selected, and the functional mode being selected from among the plural functional modes including an SMS mode and a call mode,
- wherein the input/output interface is one of an output interface and an input and output interface.

30. A method of controlling an input/output interface of a mobile terminal that receives the user command, the method comprising:
- receiving the user command for selecting a functional mode of the mobile terminal from plural functional modes of the mobile terminal;
- wherein the selected functional mode is determined to be selected, from the plural functional modes, according to a physical orientation of the mobile terminal, as the user command, relative to a gravitational pull, and
- selectively providing a physical sensation to the user when a result of the determination indicates that the user has selected the selected functional mode based on the user command, wherein the functional mode being selected from among the plural functional modes including an SMS mode and a call mode,
- wherein the input/output interface is one of an output interface and an input and output interface.

31. The method of claim 30, wherein the physical sensation corresponds to the selected functional mode.

32. A method of controlling an input/output interface of a mobile terminal that receives a user command, the method comprising:
- receiving the user command for selecting a functional mode of the mobile terminal from plural functional modes of the mobile terminal;
- wherein the selected functional mode is determined to be selected, from the plural functional modes, according to a movement of the mobile terminal, as the user command, relative to a gravitational pull, and
- selectively providing a physical sensation to the user when a result of the determination indicates that the user has selected the selected functional mode based on the user command, wherein the functional mode being selected from among the plural functional modes including an SMS mode and a call mode,
- wherein the input/output interface is one of an output interface and an input and output interface.

33. The method of claim 32, wherein the physical sensation corresponds to the selected functional mode.

34. The apparatus of claim 1, wherein the mobile terminal is configured to perform the plural functional modes, including at least one of a cellular phone functional mode to control the mobile terminal to operate as a cellular phone and a Personal Digital Assistant (PDA) functional mode to control the mobile terminal to operate as the PDA.

* * * * *